United States Patent
Tsubouchi et al.

(10) Patent No.: US 6,755,116 B1
(45) Date of Patent: Jun. 29, 2004

(54) NEGATIVE PRESSURE TYPE BOOSTER

(75) Inventors: Kaoru Tsubouchi, Toyota (JP);
Akihiko Miwa, Anjyo (JP); Nobuyuki Hirota, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 15 days.

(21) Appl. No.: 10/111,705

(22) PCT Filed: Oct. 27, 2000

(86) PCT No.: PCT/JP00/07564

§ 371 (c)(1),
(2), (4) Date: Aug. 21, 2002

(87) PCT Pub. No.: WO01/32488

PCT Pub. Date: May 10, 2001

(30) Foreign Application Priority Data

Oct. 29, 1999 (JP) .......................................... 11/310217
Sep. 28, 2000 (JP) ........................................ 2000-297693

(51) Int. Cl.[7] ................................................. F15B 13/16
(52) U.S. Cl. ..................................... 91/369.2; 91/376 R
(58) Field of Search ............................. 91/369.2, 369.3, 91/376 R, 367

(56) References Cited

U.S. PATENT DOCUMENTS

| 5,479,844 A | * | 1/1996 | Heibel et al. ............... 91/369.3 |
| 5,483,866 A | | 1/1996 | Schlüter |
| 5,558,001 A | * | 9/1996 | Osaka et al. ............... 91/376 R |
| 6,212,992 B1 | | 4/2001 | Tsubouchi et al. |
| 6,334,383 B1 | * | 1/2002 | Tsubouchi et al. ............ 91/367 |
| 6,408,738 B1 | | 6/2002 | Harth et al. |
| 6,467,390 B1 | | 10/2002 | Harth et al. |

FOREIGN PATENT DOCUMENTS

| FR | 2 782 044 A1 | 2/2000 |
| GB | 2 054 777 A | 2/1981 |
| JP | 5-155331 A | 6/1993 |
| JP | 7-251733 A | 10/1995 |
| JP | 8-318846 A | 12/1996 |
| JP | 8-324418 A | 12/1996 |
| JP | 9-175373 A | 7/1997 |
| JP | 10-86812 A | 4/1998 |
| JP | 11-48947 A | 2/1999 |
| WO | WO 99/59854 A2 | 11/1999 |
| WO | 99/59854 A2 | 11/1999 |
| WO | WO 00/13953 A1 | 3/2000 |
| WO | 00/13953 A1 | 3/2000 |

* cited by examiner

Primary Examiner—Edward K. Look
Assistant Examiner—Igor Kershteyn
(74) Attorney, Agent, or Firm—Burns, Doane, Swecker & Mathis, L.L.P.

(57) ABSTRACT

A negative pressure type booster, comprising a valve seat member (40), a spring (47) energizing the valve seat member (40), and a holding member (52) having an engaging part (52b) disposed on a power piston (22) movably only in radial direction and engaged with the valve seat member (40) and a tapered part (52a) in contact with a plunger (37), whereby, when the amount of movement of an input member (27) relative to the power piston (22) is larger than a specified value, the input member (27) is brought into contact with the tapered part (52a) and moves the holding member (52) in radial direction to disengage the holding member (52) from the valve seat member (40) in order to allow the valve seat member (40) to be moved rearwards.

18 Claims, 8 Drawing Sheets

NEGATIVE PRESSURE TYPE BOOSTER

TECHNICAL FIELD

This invention relates to a vacuum type brake booster for a vehicle. More particularly, the present invention relates to a vacuum type brake booster for a vehicle that is capable of compensating for shortages in the brake pedal depressing force during emergency braking operation.

BACKGROUND ART

There have been results of analysis that oftentimes, when a driver rapidly depresses the brake pedal because an obstruction has suddenly appeared in the running path of the vehicle, the stepping force which the driver applies to the brake pedal is relatively small as compared with the stepping force required to produce a brake fluid pressure of a magnitude leading to a wheel lock, so that the braking capability of the vehicle is not fully exerted. On the basis of these results, it has been proposed to install on the vehicle a device for determining, from the brake pedal depression speed and the rate of increase of oil pressure in a master cylinder, whether the braking operation is a normal braking operation or an emergency braking operation, and when it is judged that the braking operation is the emergency braking operation, the brake fluid pressure is automatically raised up to a magnitude resulting in the wheel lock.

Various constructions have been proposed for such the devices, and for example one of these devices is described in Japanese Laid Open Patent Publication No. H11-48947 (1999). This discloses a vacuum type brake booster that is constructed in such a manner that its input-output characteristics can be switched by means of a control signal from outside between at least two different characteristics (a characteristic for normal braking and a characteristic for emergency braking). With the input-output characteristics of the vacuum type brake booster being switched from the characteristic for normal braking to the characteristic for emergency braking at times of emergency braking operation, it is possible to obtain the same result as when the driver depresses the brake pedal strongly.

DISCLOSURE OF THE INVENTION

However, this conventional vacuum type brake booster includes a solenoid for switching its characteristics from the normal braking operation to the characteristics for emergency braking, and a valve seat member driven by the solenoid, apart from an annular seat valve for atmosphere inflow control. The solenoid driving signal is outputted from an electronic control means for processing signals from a pedal stroke sensor and a master cylinder oil pressure sensor. The solenoid is driven on the basis of such the signals in a way that the valve seat member having the annular valve seat for the atmosphere inflow control is away from an opposed seal member and a valve mechanism is in an output increase state. This brake booster is considerably expensive because of a necessity of the solenoid, several kinds of the sensors, the electronic control means and the like.

Therefore, it is a primary object to provide a vacuum type brake booster capable of obtaining an output increase state during the emergency braking operation by a simple and cheap mechanical structure.

To achieve the object, there is provided a vacuum type brake booster comprising: a housing for defining at least one pressure chamber therein; a movable wall member disposed in the housing to divide the pressure chamber into a constant pressure chamber and a variable pressure chamber and to be movable in the forward and backward directions with respect to the housing; a power piston connected to the movable wall member; an input member disposed in the power piston to be movable in the forward and backward directions with respect to the power piston; an output member for outputting a propulsion force of the power piston in response to the movement of the movable wall outside the booster; an annular valve seat for atmospheric air outflow control disposed in the power piston to be directed rearwardly; a valve mechanism having a movable portion opposed to the annular valve seat for atmospheric air outflow control and a fixed portion secured air-tightly to the power piston; the annular valve seat for atmospheric air outflow control being secured to a valve seat member which is movable in the forward and backward directions with respect to the power piston; further, a holding means for holding the valve seat member at a predetermined front position in the case that an advanced distance of the input member with respect to the power piston is less than a predetermined value; a movable means for shifting the valve seat member up to a predetermined distance at a rear position in the case that an advanced distance of the input member with respect to the power piston is more than the predetermined value; and a returning means for returning the valve seat member at the predetermined front position in the case that the power piston is in a predetermined position with respect to the housing.

According to this booster, in the case that a relative movement of the input member and the power piston is larger than the predetermined value, i.e., in the cases of emergency braking operation wherein the driver hurriedly depresses the brake pedal, an engagement of the valve seat member by the holding means is released and the valve seat member is moved rearward up to the predetermined distance by use of the movable means, so that the valve seat member presses the movable member of the valve mechanism rearward. As the result, the variable pressure chamber is rapidly and forcibly communicated with an atmosphere and a propulsion or thrust force more than the thrust force obtained during the normal braking operation is applied to the movable wall member, the power piston and in its turn the output member to produce a sufficiently large magnitude of the oil pressure for braking. In other words, by changing a jumping characteristic (when the braking operation is performed by depressing the brake pedal, a ratio of the output force relative to the input force becomes an infinity until the input member is abutted on the reaction member, this is referred to as the jumping), the thrust force larger than the thrust force as obtained during the normal braking operation is applied to the output member. Namely, the vacuum type brake booster having two kinds of input-output characteristics for the normal braking characteristic and the emergency braking characteristic is provided by the simple structure.

Further, the wording of "rear" indicates the brake pedal side with respect to the vacuum type brake booster or the vehicle's rear side and, the wording of "front" indicates the master cylinder side or the vehicle's front side.

Preferably, the holding means is located at a portion of the front inner-peripheral side of the power piston and has a holding member or holding members of which a front end is engaged with the power piston and a rear end is engaged with the valve seat member. According to this structure, since the valve seat member is engaged with the holding member, which is engaged with the power piston, the valve seat member is securely engaged with the power piston.

More preferably, one of the input member and the holding means is provided with a tapered portion and the holding state of the holding means is released by a cam action of the cam portion and the input member or the holding means, when an advanced distance of the input member with respect to the power piston is more than the predetermined value. It is possible to rapidly shift the braking operation from the characteristic for normal braking to the characteristic for emergency braking.

The annular valve seat for atmosphere outflow control is composed of a first annular valve seat for atmosphere outflow control which is integral with the power piston and a second annular valve seat for atmosphere outflow control which is aligned substantially with the first annular valve seat and movable forward and rearward with respect to the power piston. According to this structure, by separating the annular valve seat for atmosphere outflow control from the first annular valve seat for atmosphere outflow control which is integral with the power piston and the second annular valve seat which is aligned substantially with the first annular valve seat for atmosphere outflow control, the vacuum type brake booster having two kinds of input-output characteristics for the normal braking characteristic and the emergency braking characteristic is constructed only by adding the second annular valve seat for atmosphere outflow control to the power piston of the conventional brake booster having the annular valve seat for atmosphere outflow control. This leads to a low price of the brake booster due to the share of parts as used in the conventional brake booster.

The additional effects and objects of the present invention will become more apparent from the following detailed description with reference to the accompanying drawings. Further, the term of "front" as used in the description indicates the front side of the vehicle and the term of "rear" as used in the description indicates the rear side of the vehicle.

BEST MODE FOR CARRYING OUT THE INVENTION

The invention will now be described by way of examples with reference to the accompanying drawings.

Figure 1:
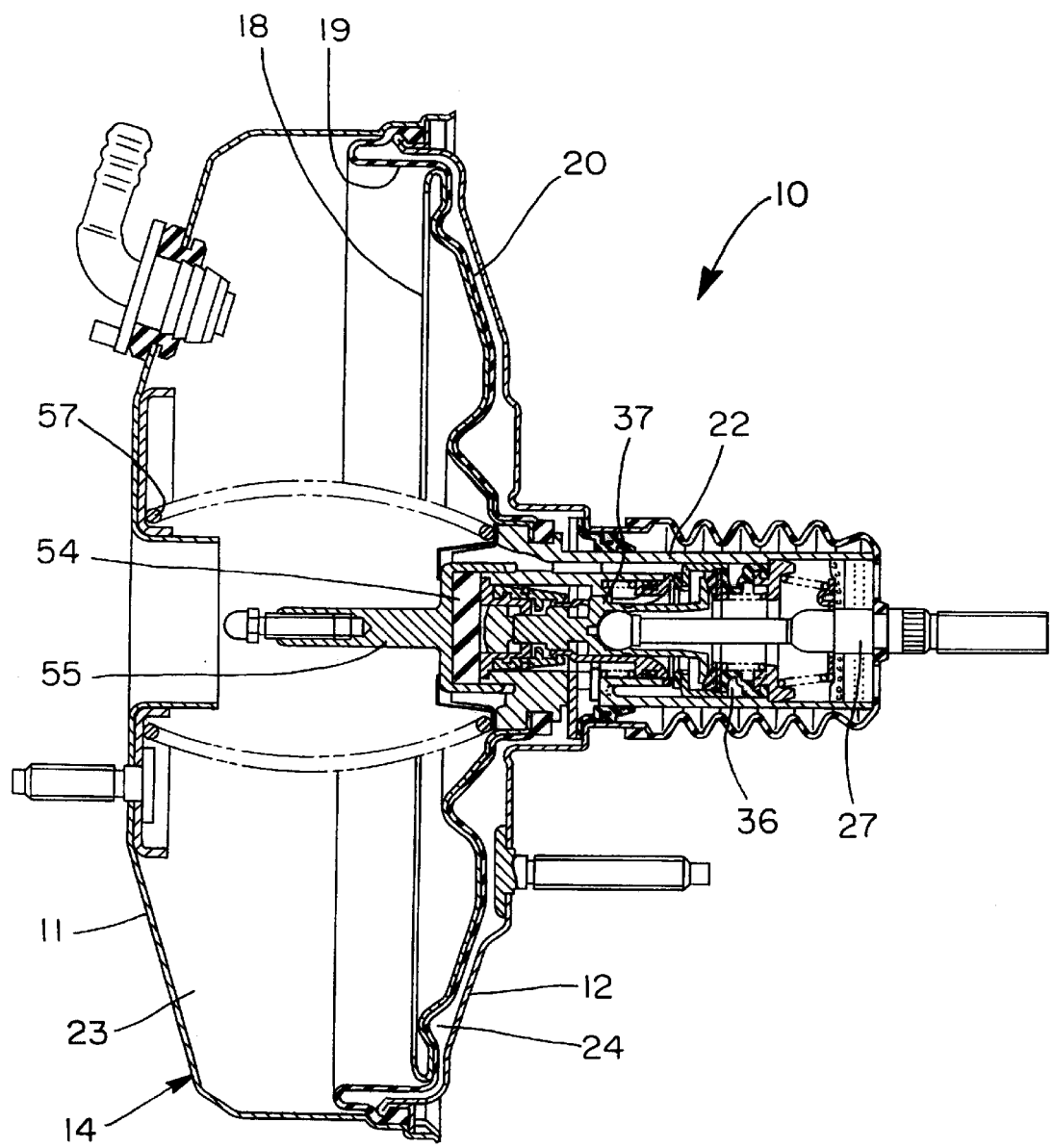
FIG. 1 is a cross-sectional view of a vacuum type brake booster for a vehicle constituting a first embodiment of the present invention.
Figure 2:
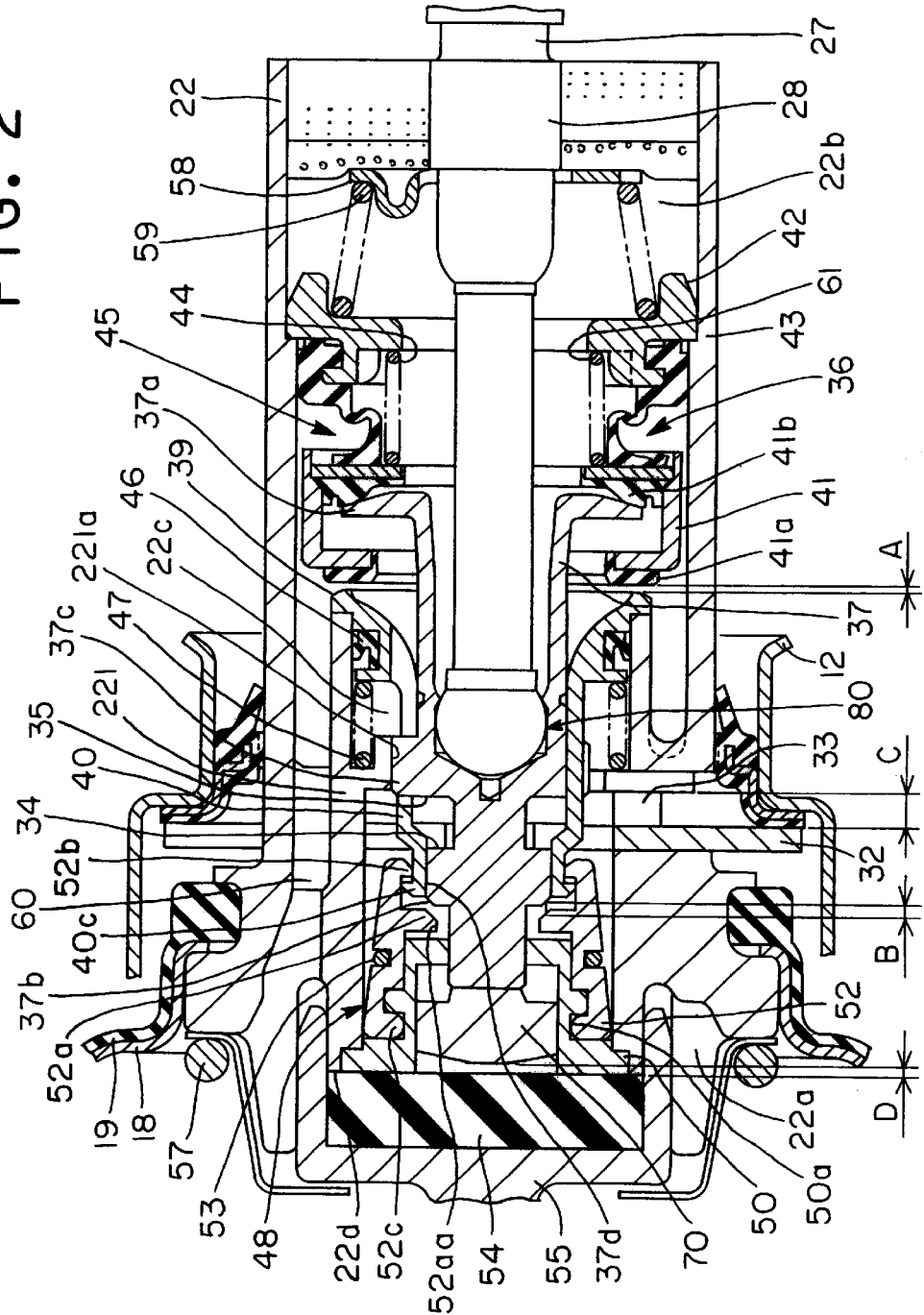
FIG. 2 is an enlarged cross-sectional view of a main portion of the vacuum type brake booster shown in FIG. 1.

FIGS. 1 and 2 each is a cross-sectional view of a vacuum type brake booster for a vehicle according to a first embodiment of the present invention. FIG. 2 is an enlarged view of a part of FIG. 1.

The vehicle vacuum type brake booster 10 (brake booster) in FIG. 1 includes a housing 14 defined by a front side shell 11, a rear side shell 12 and a movable wall 20 to thereby define within the housing 14 a constant pressure chamber 23 which is communicated with a vacuum source and a variable pressure chamber 24 which is communicated with an atmosphere.

The movable wall 20 within the housing 14 is comprised of a metal plate 18 and a rubber diaphragm 19 and disposed to be moved forward and rearward in the housing 14.

A bead at the outer edge of the diaphragm 19 is fixed in an airtight manner by a folded portion of the outer periphery of the rear side shell 12 and the front side shell 11. Also, a bead at the inner edge of the diaphragm 19 is air-tightly fixed with the plate 18 within a groove formed on an outer circumferential periphery of the front side flange of a power piston 22.

The constant pressure chamber 23 is connected to an engine intake manifold (not shown), which serves as a negative pressure source, and is normally held at a negative (suction) pressure during the engine operation. The communication of the variable pressure chamber 24 and the constant pressure chamber 23 is established or interrupted by a passage 60 and a valve mechanism 36, and the communication of the variable pressure chamber with respect to the atmosphere is controlled through the valve mechanism 36.

As seen in FIGS. 1 and 2, defined within the power piston 22 are a first space 22a positioned inside the front end (is FIGS. 1 and 2, left side) of the power piston 22 and connected with the constant pressure chamber, a second space 22b positioned inside the rear end (in FIGS. 1 and 2, right side) of the power piston 22 and connected with the atmosphere, and a middle part 221 interposed between the first space 22a and the second space 22b. The middle part 221 has in its center a third space 22c connecting the first space 22a to the second space 22b, and a passage 60 connecting the first space 22a to the second space 22b separately from the third space 22c.

An input rod 28 and a plunger 37 constructing an input member 27 is disposed inside the power piston 22 and passes through the first space 22a, the second space 22b and the third space 22c so as to be able to advance/retract with respect to the power piston 22.

Also, the input rod 28 and the plunger 37 are integrally connected to a connecting portion 80 and the input rod 28 is connected at its rear side with the brake pedal (not shown).

An output member 55 is fitted into the front side end of the power piston 22 and a reaction member 54 is disposed between the front side end of the power piston 22 and the output member 55. Further, an abutment member 70 is disposed between the reaction member 54 and the front side end of the plunger 37 and inside an engagement member 50 positioned integral with the power piston 22 so as to be able to advance/retract.

A key member 32 is provided for defining advance and retreat limits position of the plunger 37 and the input member 28 with respect to the power piston 22. This key member 32 passes through a radial hole 33 formed in a middle part 221b the power piston 22. The front-rear direction (in FIGS. 1 and 2, left and right) thickness dimension of the key member 32 is smaller than the front-rear direction dimension of the radial hole 33, and the key member 32 can move with respect to the power piston 22 in the front-rear direction through a distance C shown in FIG. 2.

The key member 32 can abut upon the rear side shell 12 at the rear face of both ends that projects radially outward by from the power piston 22, and the movement limit position of the power piston 22 with respect to the housing 14 is a position in which the front side wall of the radial hole 33 abuts upon the front face of the key member 32 and the rear face of the key member 32 abuts upon the rear side shell 12.

The middle part of the key member 32 is positioned between a pair of flanges 34, 35 formed on the middle part of the plunger 37, and the movement limit position of the plunger member 37 with respect to the power piston 22 is a position in which the rear face of the flange 34 abuts upon the front face of the key member 32 and the rear face of the key member 32 abuts upon the rear wall of the radial hole 33. The advance limit position of the plunger member 37 with respect to the power piston 22 is a position in which the front face of the flange 35 abuts upon the rear face of the key member 32 and the front face of the key member 32 abuts upon the front wall of the radial hole 33.

A valve mechanism 36 is disposed inside the power piston 22 and switchable among an output decreasing action state, an output holding action state and a output increasing action state. In the output decreasing action state, the valve mechanism 36 connects the variable pressure chamber 24 to the constant pressure chamber 23 while cutting off the variable pressure chamber 24 from the atmosphere. In the output holding action state, the valve mechanism cuts off the variable pressure chamber 24 from both the constant pressure chamber 23 and the atmosphere. In the output increasing action state, the valve mechanism 36 cuts off the variable pressure chamber 24 from the constant pressure chamber 23 while connecting the variable pressure chamber 24 with the atmosphere.

This valve mechanism 36 is comprised of an annular valve seat 37a for atmospheric air inflow control that is formed integrally with the rear end of the plunger member 37 and an annular valve seat 39 for atmospheric air outflow control that is formed integrally with the rear part of the valve seat 40 around the rear opening of the third space 22c. The valve mechanism 36 also includes a cylindrical member 45 having a moving part 41 having valves 41a, 41b which face the annular valve seat 37c for atmospheric air inflow control and the annular valve seat 39 for atmospheric air outflow control, and a fixed part 43 that is air-tightly fixed to the power piston 22 by means of a retainer 42. The moving part 41 is urged forward by a spring 44.

The valve seat member 40 is disposed inside the third space 22c of the middle part 221 and able to advance/retract with respect to the power piston 22.

Figure 4:
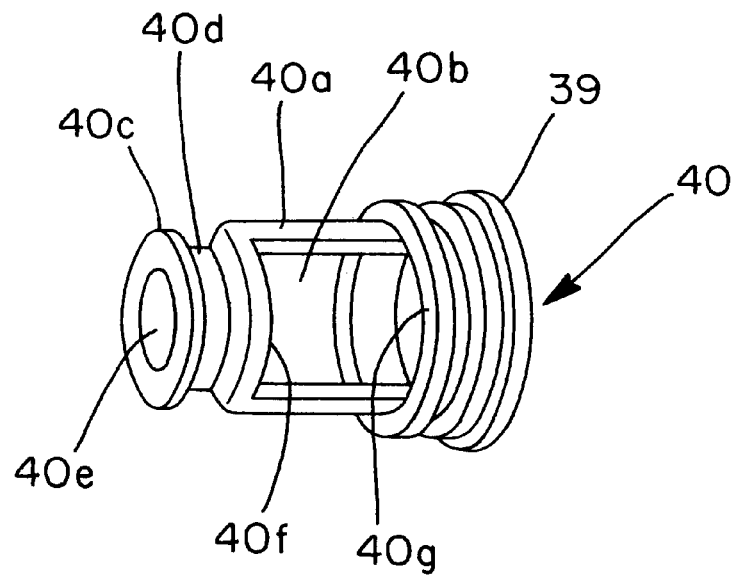
FIG. 4 is a perspective view showing a valve seat member 40 before assembled.

As shown in FIG. 4, the valve seat member 40 has slit 40b into which the abutment portion 37c projecting radially from the plunger 37 is inserted, and a through hole 40e extending in an axial direction of the valve seat member 40. Also, the key member 32 is inserted into the slit 40b.

When the plunger 37 is inserted into the through hole 40e of the valve seat member 40, the abutment portion 37c and the slits 40b are positioned in opposed relation to each other so that the abutment portion 37c projects outside the valve seat member 40 through the slits 40b. When the plunger 37 with the valve seat member 40 is disposed in the power piston 22, the outer surface of the abutment portion 37c slidably abuts upon a concave portion 221a of the inner circumferential surface of the middle part 221. The plunger member 37 is thus slidably supported by way of the abutment portion 37c in the front-rear direction on the inner circumferential part of the middle part 221, that is, on the inner circumferential part of the power piston 22.

The valve seat member 40 is positioned between the plunger member 37 and the middle part 221 of the power piston 22. At the rear end where the annular valve seat 39 for atmospheric air outflow control is formed, the valve seat member 40 slidably abuts in the front-rear direction upon the inner circumferential surface of the middle part 221. That is, the power piston 22 has the middle part 221 as a holding part for slidably holding the valve seat member 40 in the rear direction.

An annular seal member 46 for maintaining an airtight seal between the rear end part of the valve seat member 40 and the inner circumferential surface of the middle part 221 is fitted in the rear end part of the valve seat member 40 which abuts upon the middle part 221. Also, the valve seat member 40 is urged rearward by a spring 47 (urging member) which is disposed between the valve seat member 40 and the flange 34.

A spring 59 is disposed between a retainer 58 engaged with the input rod 28 and a retainer 42 engaged with the power piston 22 to urge the input rod 28 rearward. When the brake pedal is not depressed, the spring 59 causes the annular valve seat 37a for atmospheric air inflow control to abut on the valve 41b of the movable portion or moving part 41 of the valve mechanism 36 and hold the valve 41a of the movable portion 41 in a state that the movable portion 41a is away from the annular valve seat 39 for atmospheric air outflow control by a distance A.

The passage 60 and the first space 22a formed in the middle part 221 connect the valve mechanism 36 with the constant pressure chamber 23, and the third space 22c connects the valve mechanism 36 with the variable pressure chamber.

Inside the front part of the power piston 22, which is in the middle part 221, a movable means is disposed for causing the valve seat member 40 to retreat. This movable means is composed of the spring 47 (urging member) for urging the valve seat member 40 in the rear direction and the key member 32.

Figure 5:
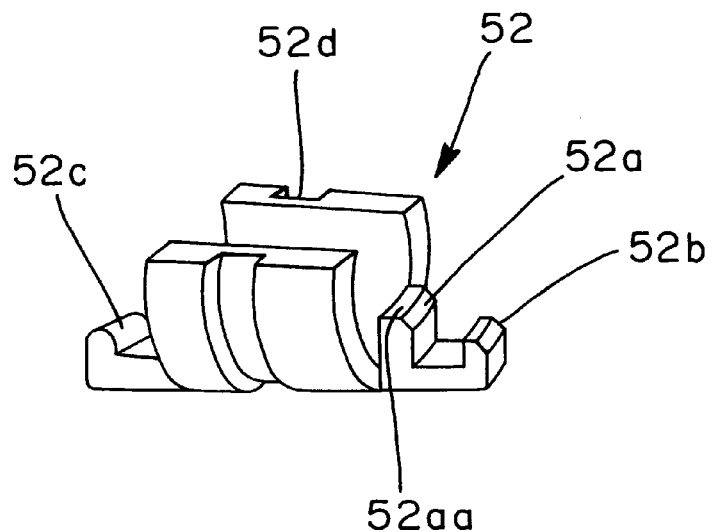
FIG. 5 is a perspective view showing a holding member 52 before assembled.

A holding means 48 is disposed in the first space 22a, namely an interior of the front portion of the power piston 22. The holding means 48 is composed of holding members 52 each having an engagement part 52 engageable with an engaged part 40c of the valve seat member 40 and a ring like resilient member 53 for urging the holding members 52 radially inwardly to shorten its diameter. As shown in FIG. 5, the holding member 52 is formed by two halves of a hollow truncated cone shape which is divided into two pieces along a plain surface passing through its axis and two halves are assembled in the power piston 22 in the opposed form. An engagement part 52c of each of the holding members 52 is fitted into an engagement groove 50a of the engagement member 50 secured to the front portion of the power piston 22. Thus, it is impossible to move the holding members 52 in the forward and rearward directions, however, the holding members 52 can be radially moved around the engagement part 52c.

Figure 3:
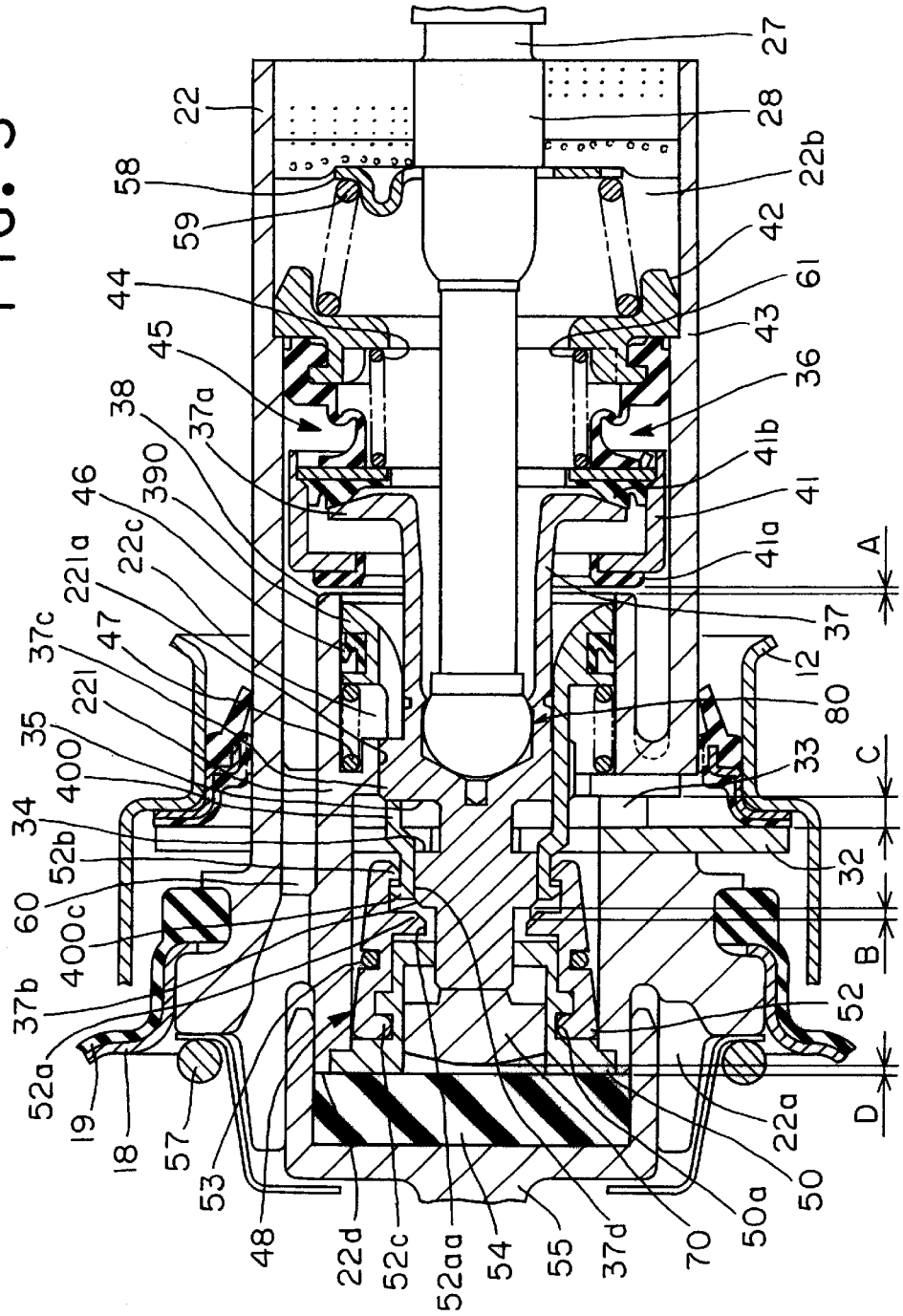
FIG. 3 is a cross-sectional view of a vacuum type brake booster according to a second embodiment of the present invention.

In FIG. 3, a second embodiment according to the present invention is illustrated. In the second embodiment, a first annular valve seat 38 for atmospheric air outflow control is integrally formed on an end face defining a rear side opening of the third space 22c of the middle part 221 of the power piston 22 and a valve seat member 400 having a second annular valve seat 390 which is opposed to the moving part 41 is disposed to be movable in the forward and rearward directions with respect to the power piston 22. The valve seat 400 is positioned inside the first annular valve seat 38. Also, the structure other than the structure as mentioned above is the same as that of the first embodiment as shown in FIG. 2.

Figure 6:
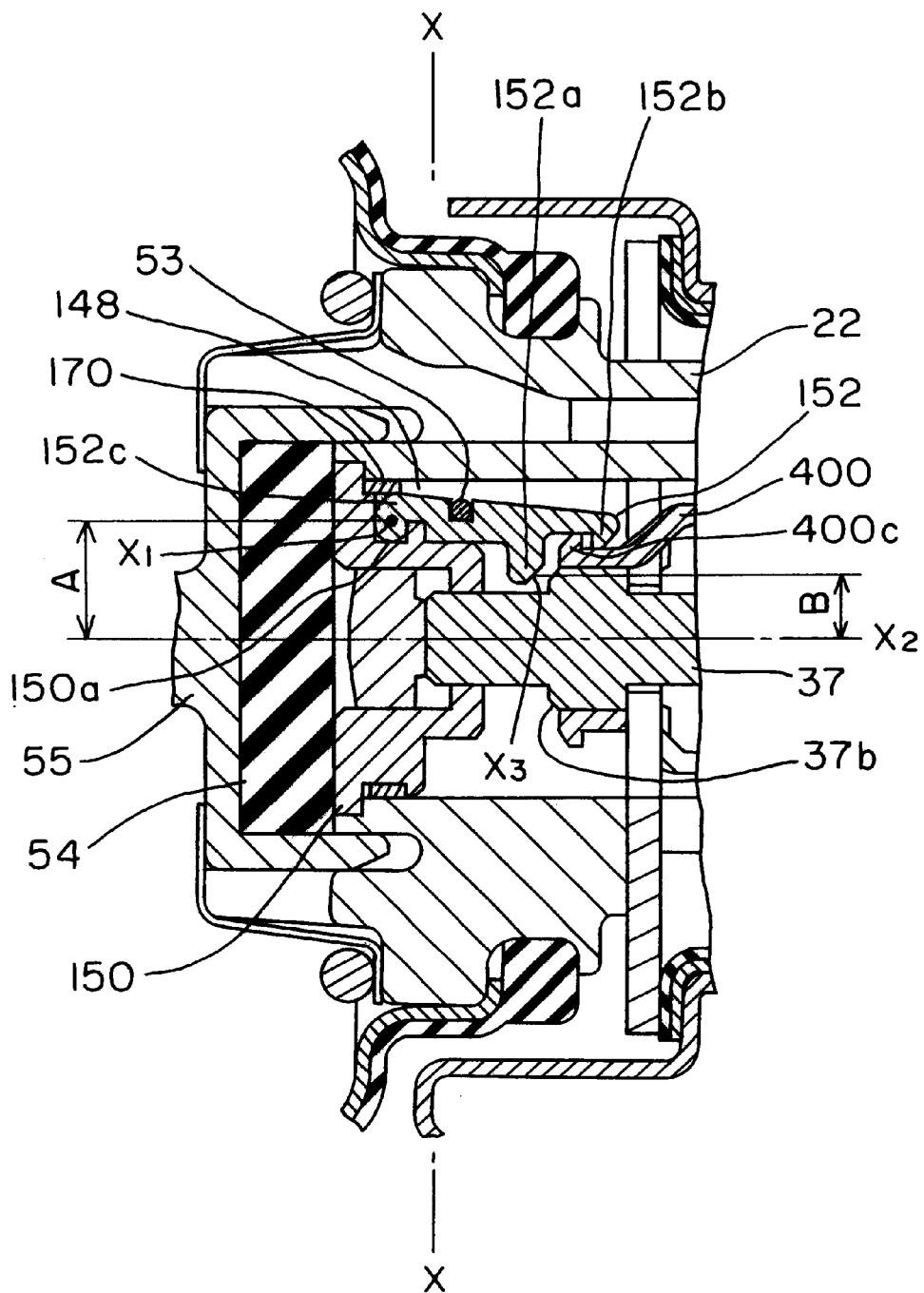
FIG. 6 is a partially broken view of a vacuum type brake booster according to a third embodiment of the present invention.

FIG. 6 shows a third embodiment of the present invention wherein a holding means 148 is different from that of the first or second embodiment. In the third embodiment, the holding means 148 is composed of holding members 152 each having an engagement part 152b engaged with an engaged part 400c of a valve seat member 400 and a ring shape resilient member 53 for urging the holding member 152 in a direction to make its diameter smaller.

Figure 7:
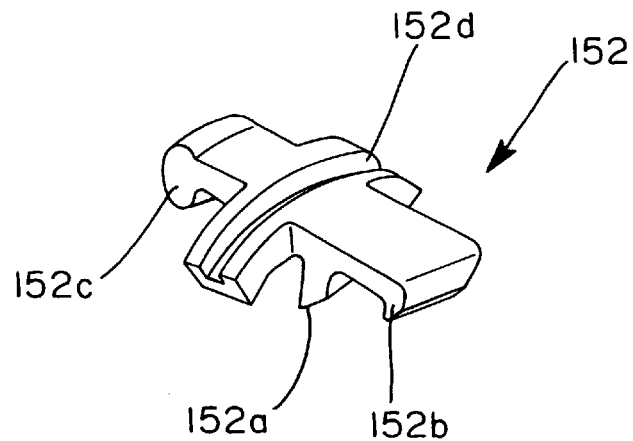
FIG. 7 is a perspective view showing a holding member 152 before assembled.
Figure 8:
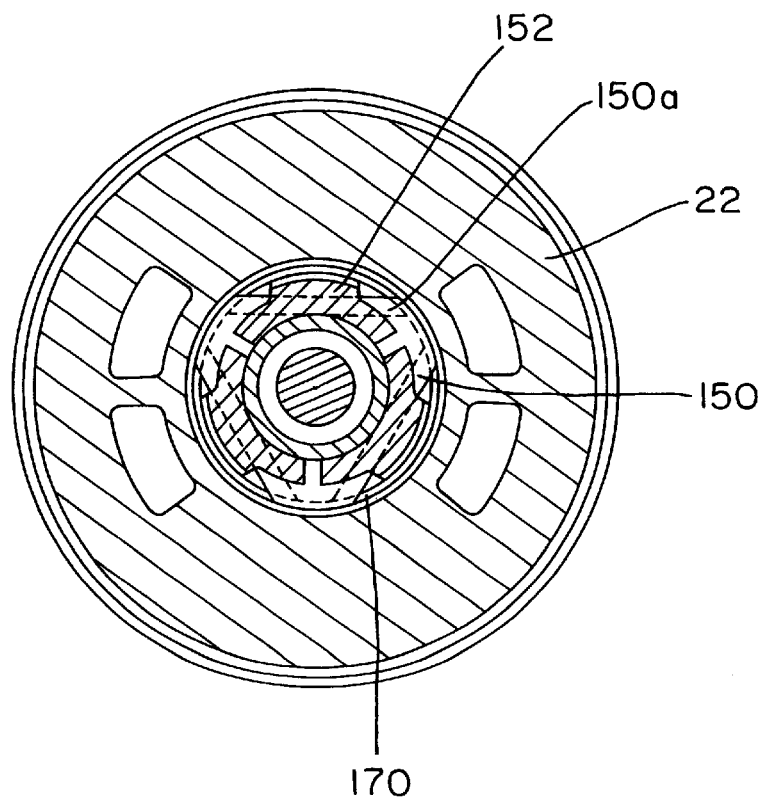
FIG. 8 is a cross-sectional view taken along the line X—X in FIG. 6.

A contact part 152c of each holding member 152 is fitted into an engagement groove 150a extending perpendicularly to an axis of the power piston 22 while being formed on an engagement member 150 secured to the front end of the power piston 22. The holding members 152 can not be moved in the forward and rearward directions, respectively, however, the holding members 152 can be moved radially around the engagement parts 152, respectively. As shown in FIG. 7, the holding members 152 are formed by dividing or cutting a hollow truncated cone shape member into three pieces along its central axis. As shown in FIG. 8, the hollow truncated cone that is divided into three pieces is assembled in opposed relation with each other.

Further, a restriction member 170 of a cylindrical member having a thin thickness is disposed on the outer peripheral surfaces of the holding members 152 so as to prevent the engagement parts 152c from slipping out from the engagement grooves 150a. Namely, even if a component of axial force is applied to the holding members 152 by a cam action due to the abutment of the tapered surface 37b of the plunger 37 and the tapered portion 152a of each holding member 152, the engagement part 152c is not lifted out of the engagement grooves 150a. Thus, the advance distance of the plunger 37 with respect to the power piston 22 is obtained without a loss so that a normal braking operation can be shifted speedily to an emergency braking operation.

As shown in FIG. 6, a plain surface, which passes through a central axis of rotation of each engagement part 152c which is positioned in each engagement groove 150a and a central line $X_3$ of the abutment surface of the tapered part 152a of each holding member 152 and the tapered part 37b of the input member or the plunger 37, is set in such a manner that an angle of inclination with respect to the central axis $X_3$ of the power piston 22 is a 30-degree angle or less. This brings a distance B between the tapered part 152a of the holding member 152 and the central axis of the power piston 22 close to a distance A between the rotation center of the engagement part 152c and the central axis of the power piston 22 and prevents the holding members 152 from being rotated in the direction (clockwise in FIG. 6) to be engaged with a valve seat member 400 by an axial component of force due to the cam action. This will be effective to achieve an object to promptly switch the braking character from the character for normal braking to the character for emergency braking.

Said angle is not only applied to the third embodiment, but also to the first, second and fourth embodiments.

Figure 9:
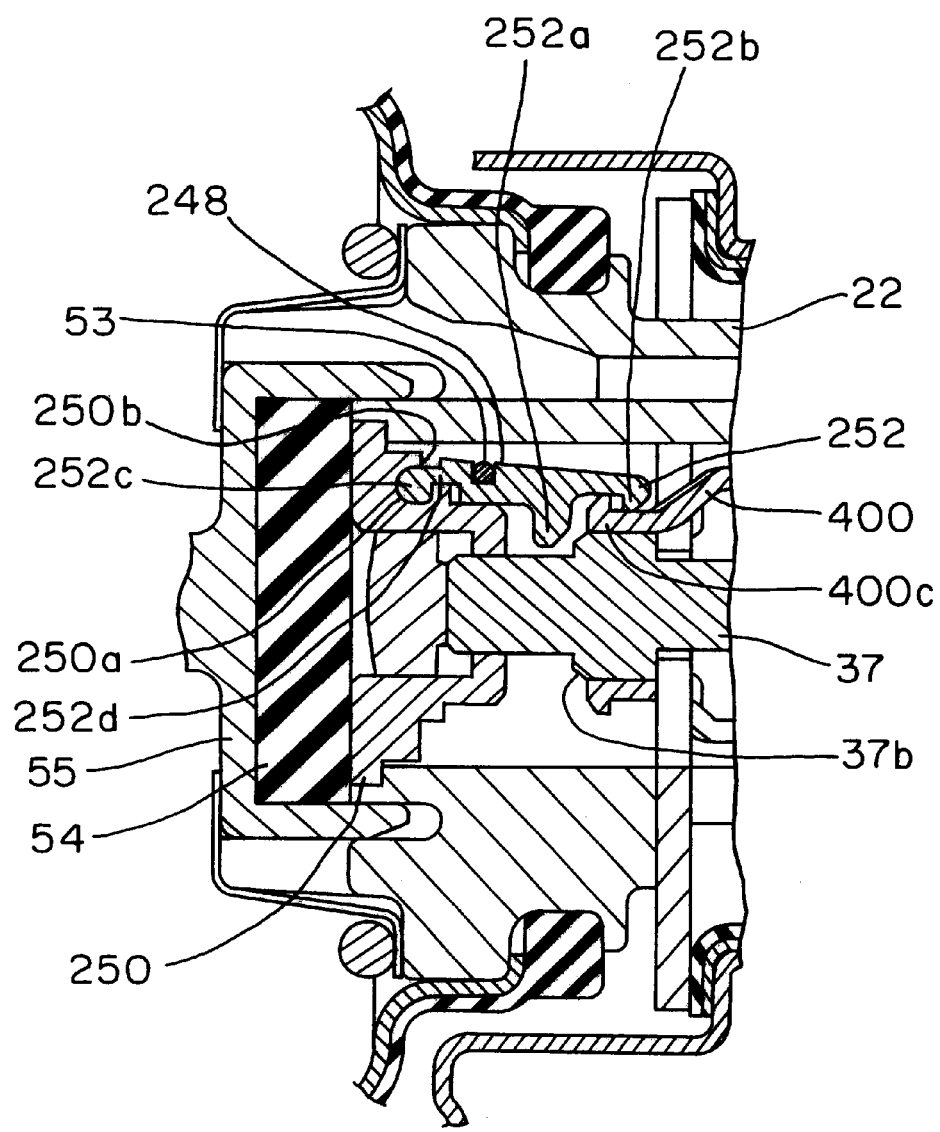
FIG. 9 is a partially broken view of a vacuum type brake booster according to a fourth embodiment of the present invention.

FIG. 9 shows the fourth embodiment of the present invention wherein a holding means 248 is different from that of the first, second and third embodiments. In the fourth embodiment, the holding means 248 is composed of holding members each 252 having an engagement part 252b engageable with an engaged part 400c of a valve seat member 400, and the ring shape resilient member 53 for urging the holding member 252 to make its diameter smaller.

The engagement part 252c of the holding member 252 is connected to the main body of the holding member 252 through a connecting part 252b and formed in a cylindrical shape.

Also, an engagement groove 250a is formed on an engagement member 250 secured to a front portion of the power piston 22 and perpendicular to the central axis of the power piston 22. The engagement groove 250a is of a cylindrical inner hole into which the engagement part 252c of the holding member 252 is inserted. Further, the engagement groove 250a has a cut-out portion 250b extending along the engagement part 250a.

The engagement part 252c is inserted into the engagement groove 250a from the direction substantially perpendicular to the central axis of the power piston 022, then the connecting part 252b connecting the engagement part 252c and the main body of the holding member passes through the cut-out portion 250b. Namely, the engagement part 252c and the engagement groove 250a make a joint like connection. As the result, the holding member 252 is smoothly rotated around the central axis of the engagement groove 250a or around the axis perpendicular to the central axis of the power piston 22. Because of the joint like connection, the engagement part 252 does not slip out from the engagement groove 250a and an emergency braking operation of a high reliability will be executed.

Also, each holding member 252 has the same structure as that of the third embodiment as shown in FIG. 7 excepts the engagement part 152c. Namely, each holding member 252 is formed by dividing or cutting a hollow truncated cone member into three pieces or by cutting the hollow truncated cone member into three plain surfaces passing through the central axis. These three pieces are assembled in the opposed relation with each other as well as the third embodiment as shown in FIG. 8.

An operation of the vacuum type brake booster will be described, however, since an operation of the brake booster in the normal operation state is well known, an explanation thereof will be omitted. The operation of the brake booster in the emergency braking state will be described hereinafter.

The characteristic for emergency braking of the vacuum type braking booster according to the present invention is performed by changing a jumping character and applying a propulsion or thrust force to an output member, of which an amount is larger than a magnitude of a thrust force under the normal braking operation. In FIG. 2, to change the jumping character, a distance D between the abutment member 70 and the reaction member 54 is preferably made larger. The enlargement of the distance D is the same thing as the enlargement of the distance between the abutment surface 22d of the power piston 22 with the reaction member 54 and the annular valve seat 39 for atmospheric air inflow control, and the enlargement of the distance between the abutment surface 22d of the power piston 22 with the reaction member 54 and the annular seat valve 37a for atmospheric air inflow control. Namely, the distance D is made larger by moving the annular valve seat 39 and the annular valve seat 37a rearward, the abutment member 70 makes an output larger until a reaction force from the reaction member 54 is received and a ratio of the output with respect to the input becomes infinite. The output under the jumping condition becomes larger as compared with that in the normal state.

The actual operation will be described on the basis of FIGS. 1 to 9.

Under the emergency condition where the driver depresses the brake pedal in a fluster, when an amount of a relative movement of the power piston 22 with respect to the input member 27 is larger than the predetermined distance B, the tapered surface 37b of the plunger 37 is abutted on the tapered part 52a of the holding member 52 and the holding member 52 is enlarged radially against the urging force of the ring shape resilient member 53.

When a minimized internal diameter portion 52aa of the tapered portion 52a runs on to a stepped portion 37d of the plunger 37, the engagement of the engaged portion 40c of the valve seat member 40 and the engagement part 52b of the holding member 52 is released. Since the valve seat member 40 is urged by the spring 47 (urging member) rearward, the valve seat member 40 is moved rearward by the spring 47 (urging force) soon after the engagement of to the engaged part 40c is released.

When the valve seat member 40 is moved rearward, the annular valve seat 39 for atmospheric air outflow control is abutted on a valve 41a making the moving part 41 of the valve mechanism 36 and the communication of the constant pressure chamber 23 and the variable pressure chamber 24 is interrupted. Since the plunger 37 is moving forward together with the input rod 28 and the valve seat member 40 forces the moving part 41 rearward, the annular seat valve 37a for atmospheric air inflow control is rapidly away from the valve 41b making the moving part 41b of the valve mechanism 36 and the variable chamber 24 is communicated with the atmosphere. As the result, the communication of the variable chamber 24 with the atmosphere and the interruption of the communication of the constant pressure chamber 23 with the variable pressure chamber 24 are rapidly made. The distance between the abutment 22d of the power piston 22 which is abutted on the reaction member 54 and the annular valve seat 38 for atmospheric air outflow control and also the distance between the abutment surface 22d of the power piston 22 which is abutted on the reaction member 54 and the annular valve seat 37a for atmospheric air inflow control are made larger. Thus, the output under the jumping condition becomes greater as compared with that of the normal state.

Figure 10:
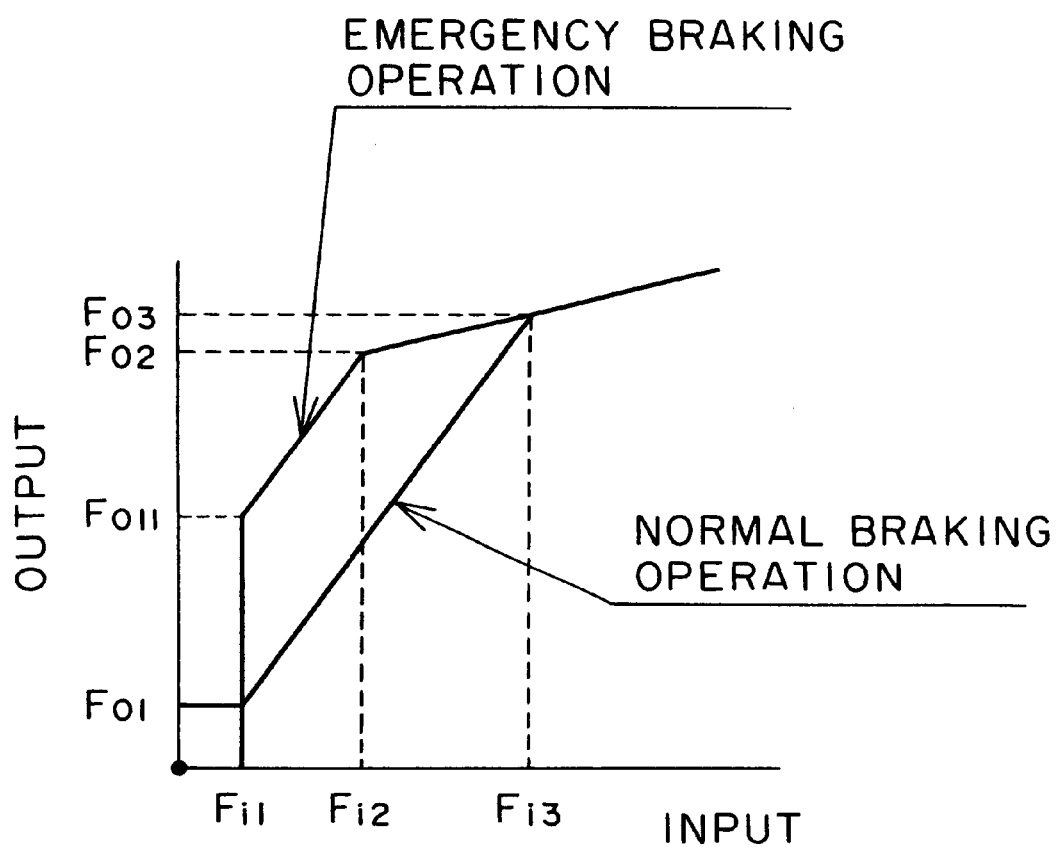
FIG. 10 is a view showing a relation of a force (input) applied to an input rod 28 and a thrust force (output) of an output member 55.

FIG. 10 shows the characteristics for normal braking operation and for emergency braking operation. In FIG. 10, the jumping in the normal braking state is capable of obtaining the magnitude of the output $F_{O1}$ and the jumping in the emergency braking state is increased or raised up to the magnitude of $F_{O11}$ so as to produce a large amount of the brake oil pressure.

When the brake pedal is returned after the braking operation is terminated, the plunger 37 is moved rearward while the flange surface 34 thereof is abutted on the key member 32. When the key member 32 is abutted on the rear side shell 12 (fixed member), the key member 32 is abutted on the front side groove wall 40f (refer to FIG. 4) of the valve seat member 40 so as to restrict the rearward movement of the valve seat member 40 which is moving rearward together with the power piston 22. At this time, the rearward movement of the power piston 22 is further continued, the engagement portion of the holding member 52 retreating together with the power piston 22 is engaged with the engaged part 40c of the valve member 40 which is abutted on the rear side shell 12 (fixedmember) through the key member 32 and not moved. Thus, the engagement of the holding member 52 and the valve seat member 40 which was released by the emergency braking operation is again established and the brake booster is ready for a next emergency braking operation.

INDUSTRIAL APPLICABILITY

According to the present invention, a low price of the vacuum type brake booster which is simple in structure and has two kinds of input-output characteristics for a normal braking and an emergency braking can be provided without necessity of solenoids, all sort of sensors and electronic devices.

What is claimed is:

1. A vacuum type brake booster comprising:
   a housing for defining at least one pressure chamber therein;
   a movable wall member disposed in the housing to divide the pressure chamber into a constant pressure chamber and a variable pressure chamber and to be movable in forward and backward directions with respect to the housing;
   a power piston connected to the movable wall member;
   an input member disposed in the power piston to be movable in forward and backward directions with respect to the power piston;
   an output member for outputting a propulsion force of the power piston in response to the movement of the movable wall member outside the booster;
   an annular valve seat for atmosphere air outflow control disposed in the power piston to be directed rearwardly;
   a valve mechanism having a movable portion opposed to the annular valve seat for atmospheric air outflow control and a fixed portion secured air-tightly to the power piston;
   the annular valve seat for atmospheric air outflow control being secured to a valve seat member which is movable in forward and backward directions with respect to the power piston;
   further, a holding means for holding the valve seat member at a predetermined front position in the case that an advanced distance of the input member with respect to the power piston is less than a predetermined value;
   a movable means for shifting the valve seat member up to a predetermined distance at a rear position in the case that an advanced distance of the input member with respect to the power piston is more than the predetermined value; and
   a returning means for returning the valve seat member at the predetermined front position in the case that the power piston is in a predetermined position with respect to the housing;
   wherein the holding means is disposed at the front end inner peripheral side of the power piston and has an engagement portion engageable with the valve seat member.

2. A vacuum type brake booster according to claim 1, wherein the holding means includes a holding member which is engaged at its front end with the power piston or a member on the power piston side and at its rear end with the valve seat member.

3. A vacuum type brake booster according to claim 2, wherein the holding member is composed of a plurality of members and a ring shape resilient member for urging the members inward by a predetermined restraint force is provided.

4. A vacuum type brake booster according to claim 3, wherein three holding members are provided.

5. A vacuum type brake booster according to claim 1, wherein at least one of the input member and the holding means is provided with a tapered portion, the holding of the holding means is released by a cam action of the tapered portion and the holding means or the input member when the advanced distance of the input member with respect to the power piston is more than the predetermined distance.

6. A vacuum type brake booster according to claim 5, wherein an angle of the inclination of a plane surface passing through a rotation center within the engagement groove of the engagement part and an axis of an abutment surface of the tapered portion of the holding member and the tapered portion of the input member is less than 30°.

7. A vacuum type brake booster according to claim 1, wherein the annular valve seat for atmospheric air outflow control includes a first annular valve seat for atmospheric air outflow control integral with the power piston and a second annular valve seat for atmospheric air outflow control movable in the forward and rearward directions with respect to the power piston and substantially coaxial with the first annular valve seat.

8. A vacuum type brake booster according to claim 1, wherein the movable means includes at least an urging member for urging the valve seat member rearward.

9. A vacuum type brake booster according to claim 1, wherein the returning means includes a key member which is movable up to the predetermined distance in the forward and rearward directions and radially passes through the power piston so as to restrict the rearward movement of the valve seat member with respect to the power piston, and a fixed member secured to the housing, the returning means causing the valve seat member to be returned to the predetermined front position by the forward movement thereof with respect to the power piston.

10. A vacuum type brake booster according to claim 1, wherein the power piston is provided with an engagement groove extending perpendicularly to the axis of the power piston, and the holding member has an engagement part which engaged with the engagement groove.

11. A vacuum type brake booster according to claim 10, wherein the engagement part of the holding member is formed substantially in a cylindrical shape, and the engagement groove of the power piston is provided with a cut-out portion for allowing the holding member to rotate, the engagement groove is cylindrical inner hole into which the engagement part is fitted.

12. A vacuum type brake booster according to claim 1, wherein the engagement member which is one of parts of the power piston is fixed to the front end of the power piston, and the holding means is disposed between the engagement member and the power piston.

13. A vacuum type brake booster according to claim 12, further comprising a restriction member for restricting an outward movement of the engagement part of the holding member.

14. A vacuum type brake booster for a vehicle comprising: a movable partition member defining a constant pressure chamber and a variable pressure chamber in a housing which is secured to a stationary member; a power piston secured to the movable partition member; an input member movable in the forward and rearward directions with respect to the power piston and receiving an operation force from the outside; an output member for outputting a thrust force of the power piston outside; a valve mechanism having a first valve member for introducing an atmospheric air pressure into the variable pressure chamber and a second valve member for introducing a section pressure in the constant pressure chamber into the variable pressure chamber; a valve seat member movable into the forward and rearward directions to actuate the valve mechanism; and a holding means for moving the valve seat member rearward independent of the movement of the power piston when an advanced distance of the input member with respect to the power piston is move than the predetermined distance; the holding means being able to have a factor or factors of the movement in a radial and/or axial direction, and the holding member having an engagement part engageable with the valve seat member.

15. A vacuum type brake booster according to claim 14, wherein the holding member is disposed between an inner peripheral surface of the hollow power piston and the input member.

16. A vacuum type brake booster according to claim 15, wherein the valve seat member has a part engageable with the holding member, and an abutment of the part on the holding member causes at least a part of the holding member to be shifted in a radial and/or axial direction so as to release the engagement of the valve seat member and the holding member.

17. A vacuum type brake booster according to claim 14, wherein the abutment member and the reaction member are disposed between the input member and the output member to make a space between the abutment member and the reaction member larger.

18. A vacuum type brake booster according to claim 17, wherein a spring for urging the valve seat member rearward at all times is disposed between the power piston and the valve seat member.

* * * * *